United States Patent
Matsuyama

(10) Patent No.: US 7,308,518 B2
(45) Date of Patent: Dec. 11, 2007

(54) INTERRUPT CONTROLLING CIRCUIT

(75) Inventor: Hideki Matsuyama, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 244 days.

(21) Appl. No.: 11/087,660

(22) Filed: Mar. 24, 2005

(65) Prior Publication Data
US 2005/0223149 A1    Oct. 6, 2005

(30) Foreign Application Priority Data
Mar. 30, 2004    (JP) ............................. 2004-098328

(51) Int. Cl.
*G06F 13/24* (2006.01)
(52) U.S. Cl. ...................... 710/243; 710/262
(58) Field of Classification Search ........ 710/260–269, 710/240–244
See application file for complete search history.

(56) References Cited

U.S. PATENT DOCUMENTS

| | | | | |
|---|---|---|---|---|
| 3,820,079 A | * | 6/1974 | Bergh et al. ................. | 710/112 |
| 4,035,780 A | * | 7/1977 | Kristick et al. ............. | 710/244 |
| 5,146,595 A | * | 9/1992 | Fujiyama et al. ........... | 710/263 |
| 5,163,152 A | * | 11/1992 | Okamoto .................... | 710/260 |
| 5,179,704 A | * | 1/1993 | Jibbe et al. .................. | 710/262 |
| 5,218,703 A | * | 6/1993 | Fleck et al. .................. | 710/264 |
| 5,581,771 A | * | 12/1996 | Osakabe ...................... | 710/265 |
| 5,628,018 A | * | 5/1997 | Matsuzaki et al. .......... | 710/260 |
| 6,119,188 A | * | 9/2000 | Sheafor et al. ............. | 710/107 |
| 6,249,881 B1 | * | 6/2001 | Porten et al. ................. | 714/38 |
| 6,622,193 B1 | * | 9/2003 | Avery .......................... | 710/263 |
| 6,665,760 B1 | * | 12/2003 | Dotson ........................ | 710/240 |

FOREIGN PATENT DOCUMENTS

| | | |
|---|---|---|
| JP | 05-210514 | 8/1993 |
| JP | 08-297581 | 11/1996 |

* cited by examiner

*Primary Examiner*—Paul R. Myers
(74) *Attorney, Agent, or Firm*—McGinn IP Law Group, PLLC

(57) ABSTRACT

Interrupt controlling circuit by which only a desired one(s) of plural interrupts may readily be masked. An interrupt factor controlling module 105 is provided for each interrupt. An interrupt group setting register 154 holds a group number of an interrupt signal INT entered to the interrupt factor controlling module 105. An interrupt group mask register 103 holds, for each group, information as to whether or not an interrupt belonging to a group in question is to be masked. In case an interrupt has occurred and the group of the group number of the interrupt, as held by the interrupt group setting register 154, is specified by the interrupt group mask register 103 as being to be masked, the interrupt mask circuit 152 masks the interrupt.

10 Claims, 7 Drawing Sheets

FIG. 2

| Interrupt | RANK OF PRIORITY | GROUP NUMBER | Interrupt | RANK OF PRIORITY | GROUP NUMBER |
|---|---|---|---|---|---|
| INTERRUPT 0 INT(0) | 0 | 0 | INTERRUPT 8 INT(8) | 0 | 4 |
| INTERRUPT 1 INT(1) | 1 | 1 | INTERRUPT 9 INT(9) | 1 | 5 |
| INTERRUPT 2 INT(2) | 2 | 2 | INTERRUPT 10 INT(10) | 2 | 6 |
| INTERRUPT 3 INT(3) | 3 | 3 | INTERRUPT 11 INT(11) | 3 | 7 |
| INTERRUPT 4 INT(4) | 0 | 0 | INTERRUPT 12 INT(12) | 0 | 4 |
| INTERRUPT 5 INT(5) | 1 | 1 | INTERRUPT 13 INT(13) | 1 | 5 |
| INTERRUPT 6 INT(6) | 2 | 2 | INTERRUPT 14 INT(14) | 2 | 6 |
| INTERRUPT 7 INT(7) | 3 | 3 | INTERRUPT 15 INT(15) | 3 | 7 |

INTERRUPT CONTROLLING CIRCUIT

FIELD OF THE INVENTION

This invention relates to an interrupt control circuit and, more particularly, to an interrupt control circuit for masking part of plural interrupts.

BACKGROUND OF THE INVENTION

The embedded system for specified application or applications is in widespread use. The embedded system is applied in a diversity of fields, such as household electrical devices or automobiles. In the embedded system, the number of subjects controlled by a sole processor is increasing and, in keeping up therewith, the number of interrupt signals handled by the processor is also increasing. In case the processor performs system control of the electronic control equipment, at the same time as it performs self-diagnosis of the system and data backup, for example, the processor is supplied with interrupts relevant to system control and with interrupts relevant to self-diagnosis of the system and data backup.

In the system control of the electronic control equipment, the processor deals with interrupts, produced from time to time, in a manner consistent with incessantly changing operating statuses of the electronic control equipment. If the time as from the time of occurrence of an interrupt relevant to system control until actual termination of the processing exceeds a preset period of time (time constraint), the system control cannot catch up with the rate (speed) of changes in the status of the electronic control equipment, thus leading to hindrances in the system control. For this reason, the processor is required to terminate the relevant processing within a preset period of time as from the occurrence of the interrupt and to return the result. That is, a high real-time performance is required of the processor. The real-time performance herein means, in general, the capability of the system in satisfying the time constraint imposed thereon. On the other hand, as to the self-diagnosis of the system and data backup, no serious problems are raised even if the period of time as from the time of occurrence of the interrupt until the actual termination of the relevant processing is varied from time to time, such that no high real-time performance is required.

In the above processor, the time constraint, imposed on the processor, is varied with the operating states of the electronic control equipment, such that, if the electronic control equipment is high in its operating speed, the time constraint imposed on the system control is shorter, whereas, if the electronic control equipment is low in its operating speed, the time constraint imposed on the system control is longer. If the time constraint, imposed on the system, is short, or if the processing performed per unit time is increased, the allowance of the processing capability of the processor is decreased, so that, if the processor is capable of accepting the totality of the interrupts and, in this condition, excess interrupts have occurred, the processing can occasionally not be completed within the limit period of time and hence the processing may not be executed in time.

Usually, each interrupt occurs on its own factor, in a manner asynchronous with the processor operation, so that, although the occurrence itself of the interrupt cannot be suppressed, it is possible to control the interrupt that is acceptable by the processor. In this interrupt control, if there is only insufficient allowance in the processing capability of the processor, an interrupt controller operates for temporarily masking and reserving the interrupts that are only low in the real-time performance required, such that only the interrupts that are high in the real-time performance required will be accepted by the processor. This technique of temporarily masking the interrupts is disclosed in, e.g., Patent Documents 1 and 2, for example.

FIG. 6 shows a portion of a semiconductor device having the interrupt controller, as described in the Patent Document 2. An interrupt controller 202 includes an interrupt mask table 203. For each of input plural interrupt signals, the information as to whether or not these interrupt signals are to be masked, respectively, is written in the interrupt mask table 203. The interrupt mask table 203 is configured for being rewritable depending on the processing state of the CPU 201. For each interrupt signal, a priority rank is set, in dependence upon the real-time performance as required. The higher the real-time performance required of an interrupt, the higher is the priority rank accorded to an interrupt in question.

The interrupt controller 202 refers to the interrupt mask table 203 and, if the information to the effect that a given interrupt signal, out of plural input interrupt signals, is to be masked, the interrupt controller masks the interrupt signal and does not transmit the signal to the CPU 201. If conversely the information to the effect that a given interrupt signal, out of plural input interrupt signals, is not to be masked, the interrupt controller does not mask the interrupt signal and transmits the signal to the CPU 201. In this manner, only the desired interrupt signal, for which the information to the effect that the signal is not to be masked is written in the interrupt mask table 203, is rendered acceptable by the CPU 201.

In the embedded system, whether or not there is certain allowance in the processing capability of the CPU 201 is verified by the operating status of the equipment being controlled. Should there be certain allowance in the processing capability of the CPU 201, the information to the effect that no interrupt signals are masked is written in an interrupt mask table 203, so that the totality of the interrupt signals are rendered acceptable by the CPU 201. If conversely there is not certain allowance in the processing capability of the CPU 201, the information to the effect that the interrupt signals with a low priority rank are masked is written in the interrupt mask table 203, such that only the desired interrupt signals with a high priority rank are rendered acceptable by the CPU 201.

FIG. 7 shows interrupt signals, rendered acceptable by the CPU 201, in relation to the progress of the processing. The CPU 201 performs the processing of phases 1 to 6 in chronological sequence. In the present example, there are 16 interrupt signals, entered to the interrupt controller 202, namely the interrupt signals INT(0) to INT(15), there being four priority ranks of PRI#0 to PRI#3. It is noted that the smaller the suffix number, the higher is the rank of priority, such that the ranking is PRI#0>PRI#1>PRI#2>PRI#3.

In the example of FIG. 7, the priority ranks of the interrupt signals INT(0), INT(4), INT(8) and INT(12) are set to the priority rank PRI#0, whilst those of the interrupt signals INT(1), INT(5), INT(9) and INT(13) are set to the priority rank PRI#1. The priority ranks of the interrupt signals INT(2), INT(6), INT(10) and INT(14) are set to the priority rank PRI#2, whilst those of the interrupt signals INT(3), INT(7), INT(11) and INT(15) are set to the priority rank PRI#3.

During the phase 1, the volume of processing is increased, in an apparatus being controlled, such that processing cannot be completed within the constraint period of time, there being no sufficient allowance in the processing capability of the CPU 201. In this state, there are written in the interrupt mask table 203 the information for not masking the INT(0), INT(4), INT(8) and INT(12) and the information for masking the other interrupt signals. This masks all the interrupt signals, set to the priority ranks PRI#1 to PRI#3, such that only the interrupt signals, set in the priority rank PRI#0, are acceptable by the CPU 201.

The phase 2 is such a state in which operating states of the apparatus being controlled are changed, such that the constraint period of time has become slightly longer and some allowance has been produced for the processing capability of the CPU 201. In this state, the information for not masking is also written for the interrupt signals INT(1), INT(5), INT(9) and INT(13), in addition to the interrupt signals for which the information for not masking has been written in the phase 1. This masks the interrupt signals, set to the priority ranks PRI#2 and PRI#3, such that the interrupt signals set in the priority ranks PRI#0 and PRI#1 are acceptable by the CPU 201.

In the phase 3, the allowance of the processing capability of the CPU 201 is of approximately the same level as that of the phase 2, and hence the information written in the interrupt mask table 203 is similar to that for the phase 2, such that the interrupt signals, set in the priority ranks PRI#0 and PRI#1, are acceptable by the CPU 201. In the phase 4, the allowance of the processing capability of the CPU 201 is of approximately the same level as that of the phase 1, and hence the information written in the interrupt mask table 203 is similar to that for the phase 1, such that only the interrupt signals, set in the priority rank PRI#0, are rendered acceptable by the CPU 201.

In the phases 5 and 6, the allowance of the processing capability of the CPU 201 is of the same level as that of the phases 2 and 3, and hence the information written in the interrupt mask table 203 is similar to that for the phases 2 and 3. Thus, in the phases 5 and 6, the interrupt signals, set in the priority ranks PRI#0 and PRI#1, are acceptable by the CPU 203.

[Patent Document 1] JP Patent Kokai Publication JP-A-5-210514

[Patent Document 2] JP Patent Kokai Publication JP-A-8-297581

(FIG. 1 and paragraph 0018)

The disclosure of these Documents 1 and 2 are incorporated herein by reference thereto.

SUMMARY OF THE DISCLOSURE

Up to now, control is exercised such that the number of acceptable interrupts is increased as the priority ranking goes higher, depending on the processing capability of the processor. Consequently, the interrupts which are low in the priority ranking may not be rendered acceptable until there is provided some sizable allowance in the processing capability of the processor. It cannot be said that the interrupts with the low order in the priority ranking do not need to be accepted for a prolonged period of time, even granting that the real-time performance required is low. However, if the processing is in the busy state, there is raised a problem that the interrupts with the priority rank of PRI#2 or lower are not at all acceptable, as shown in FIG. 7.

If desired to render the interrupt, set in the priority rank of PRI#2, acceptable in the phase 3, for example, the interrupt controller 202 refers to the interrupt mask table 203 to exercise control such that the interrupts as set in the priority ranks of PRI#0, PRI#1 and PRI#2 are rendered acceptable. However, in this case, if interrupts occur excessively, there is a fear that the number of jobs performed by the processor is increased, thus worsening the real-time performance.

In the interrupt mask table 203, the information for masking or the information for not masking is written, from one interrupt to the next. The interrupt controller 202 refers to the interrupt mask table 203 to mask the interrupts for which is written the information for masking. Thus, if an interrupt is to be masked by the interrupt controller 202, it is necessary to perform control as it is checked in which priority rank the individual interrupt signal is set, thus complicating the control for masking. The control would be simpler if a certain number of interrupts out of plural interrupts could be masked in a lump. However, the technique was so far not practically employed. Thus there is much to be desired in the art.

There is a need in the art for an interrupt control circuit capable of readily masking only a desired interrupt or interrupts, out of plural interrupts.

Also there is a need in the art for an interrupt controlling circuit whereby an interrupt(s) with a lower priority rank may be rendered acceptable, even in case there is not sufficient allowance in the processing capability of the processor, without thereby aggravating the real-time performance.

According to a first aspect of the present invention there is provided an interrupt controlling circuit for controlling a plurality of interrupts, received or accepted by a processor, comprising a group setting register for holding information on a group, out of a plurality of groups, as set for each of interrupts in question, out of a plurality of interrupts, a mask information register for holding information for specifying whether or not to mask an interrupt belonging to the group concerned of the plural groups, first masking means for verifying whether or not an interrupt in question of the plural interrupts is to be masked, based on information of the group setting register and information of the mask information register, and first masking means for masking the interrupt based on a result of verification.

In the interrupt controlling circuit of the present invention, the first masking means masks one or more interrupts, belonging to a group specified to be masked by the mask information register, in a lump. Thus, by sequentially rewriting the information, held by the mask information register, and which is specified to be masked, the interrupts rendered acceptable by the processor can be changed readily. This enables interrupts, low in the real-time performance as required, to be transiently acceptable to avoid the risk that interrupts, low in real-time performance required, are not rendered acceptable for a prolonged period of time. By specifying a group to be masked, the interrupts belonging to the group may be masked in a lump, so that the control of the interrupt(s) to be masked may be simpler than with a conventional control in which the information as to whether or not a given interrupt is to be masked is written from one interrupt to another such as to mask the interrupt(s) in a desired manner.

Preferably, the interrupt controlling circuit preferably comprises a priority rank setting register for holding the information on the rank of priority as set for an interrupt in question, out of the plural interrupts, a priority rank holding register for holding the rank of priority of an interrupt currently accepted by a processor, and second masking means for verifying whether or not an interrupt in question of the plural interrupts is to be masked, based on the information of the priority rank setting register and the priority rank holding register, and for masking the interrupt based on the results of verification. If, in this case, an interrupt lower in the priority rank than an interrupt, currently processed by the processor, has occurred, such interrupt of lower priority may be masked, it is possible to prevent the interrupt, lower in priority rank than the interrupt, currently processed by the processor, from being accepted by the processor. It is noted that the rank of priority is set in dependence upon the real-time performance required of the processing as executed in association with the interrupt.

Preferably, the information as held in the mask information register of the interrupt controlling circuit is sequentially rewritten in dependence upon the state of processing by the processor. For example, if the processing carried out by the processor is in a busy state, such that there is no sizable allowance in the processing capability of the processor, the information which will permit the processor to accept only interrupts belonging to a desired group is preferably written in the mask information register, by way of limiting the interrupts acceptable by the processor. In this case, even in case there is no sizable allowance in the processing capability of the processor, the group(s) rendered acceptable may sequentially be changed to prevent the occurrence of a situation in which interrupts belonging to a given group are rendered unacceptable for any prolonged period of time.

According to a second aspect of the present invention there is also provided an interrupt controlling circuit for controlling a plurality of interrupts, as received or accepted by a processor, comprising a priority rank setting register for holding information on the rank of priority, as set for each of interrupts in question, out of a plurality of interrupts, a mask information register for holding, for each of a plurality of groups, information for specifying whether or not an interrupt, belonging to a rank of priority in question, out of a plurality of interrupts, is to be masked, first verification means for verifying whether or not an interrupt in question, out of the plural interrupts, is to be masked, based on information of the priority rank setting register and information of the mask information register, and first masking means for masking the interrupt based on the result of verification.

In the interrupt controlling circuit of the present invention, the first masking means masks the interrupts, specified by the mask information register as being to be masked, in a lump. Thus, by sequentially rewriting the information, held by the mask information register, and specified to be masked, the interrupts acceptable by the processor may readily be changed. By so doing, even in case there is no sizable allowance in the processing capability of the processor, the interrupts low in the priority ranking may be rendered temporarily acceptable to avoid the risk that the interrupts low in the priority rank are not accepted for any prolonged period of time. By specifying a group to be masked, the interrupts belonging to the group may be masked in a lump, so that the control of the interrupt(s) to be masked may be simpler than with a conventional control in which the information as to whether or not a given interrupt is to be masked is written from one interrupt to another such as to mask the interrupt(s) in a desired manner.

The present invention also provides an interrupt controlling circuit preferably further comprising: a priority rank holding register for holding the rank of priority of the interrupt currently accepted by the processor, and second verification means for verifying whether or not an interrupt in question of the plural interrupts is to be masked, based on information of the priority rank setting register and information of the priority rank holding register, and second masking means for masking the interrupt based on the result of verification. In this case, should an interrupt set to the priority rank lower than that of an interrupt currently accepted by the processor take place, the second masking means masks the interrupt, so that it is possible to avoid the risk that the interrupt set to the priority rank lower than that of the currently accepted interrupt is accepted by the processor.

In the interrupt controlling circuit of the present invention, the information held by the mask information register is preferably sequentially rewritten in dependence upon the status of the processing by the processor. For example, if the processing carried out by the processor is overcrowded, such that there is no sizable allowance in the processing capability of the processor, the information which will permit the processor to accept only interrupts belonging to a desired group is preferably written in the mask information register, by way of limiting the interrupts acceptable by the processor. In this case, even in case there is no sizable allowance in the processing capability of the processor, the groups rendered acceptable may sequentially be changed to prevent the occurrence of a situation in which interrupts belonging to a given group are rendered unacceptable for any prolonged period of time.

The meritorious effects of the present invention are summarized as follows.

With the interrupt controlling circuit of the present invention, in which the group of interrupts to be masked or the priority rank may be specified to mask the interrupts belonging to the group or the priority rank in a lump, control of the interrupt(s) to be masked may be simpler than the conventional. Moreover, the information held by the mask information register as being the information to be masked may sequentially be changed, in which case it is possible to avoid the situation in which a given interrupt(s) remain unacceptable for any prolonged period of time.

BRIEF DESCRIPTION OF THE DRAWINGS

FIG. 2 is a block diagram showing the ranks of priority and groups as set for each.

PREFERRED EMBODIMENTS OF THE INVENTION

Figure 1:
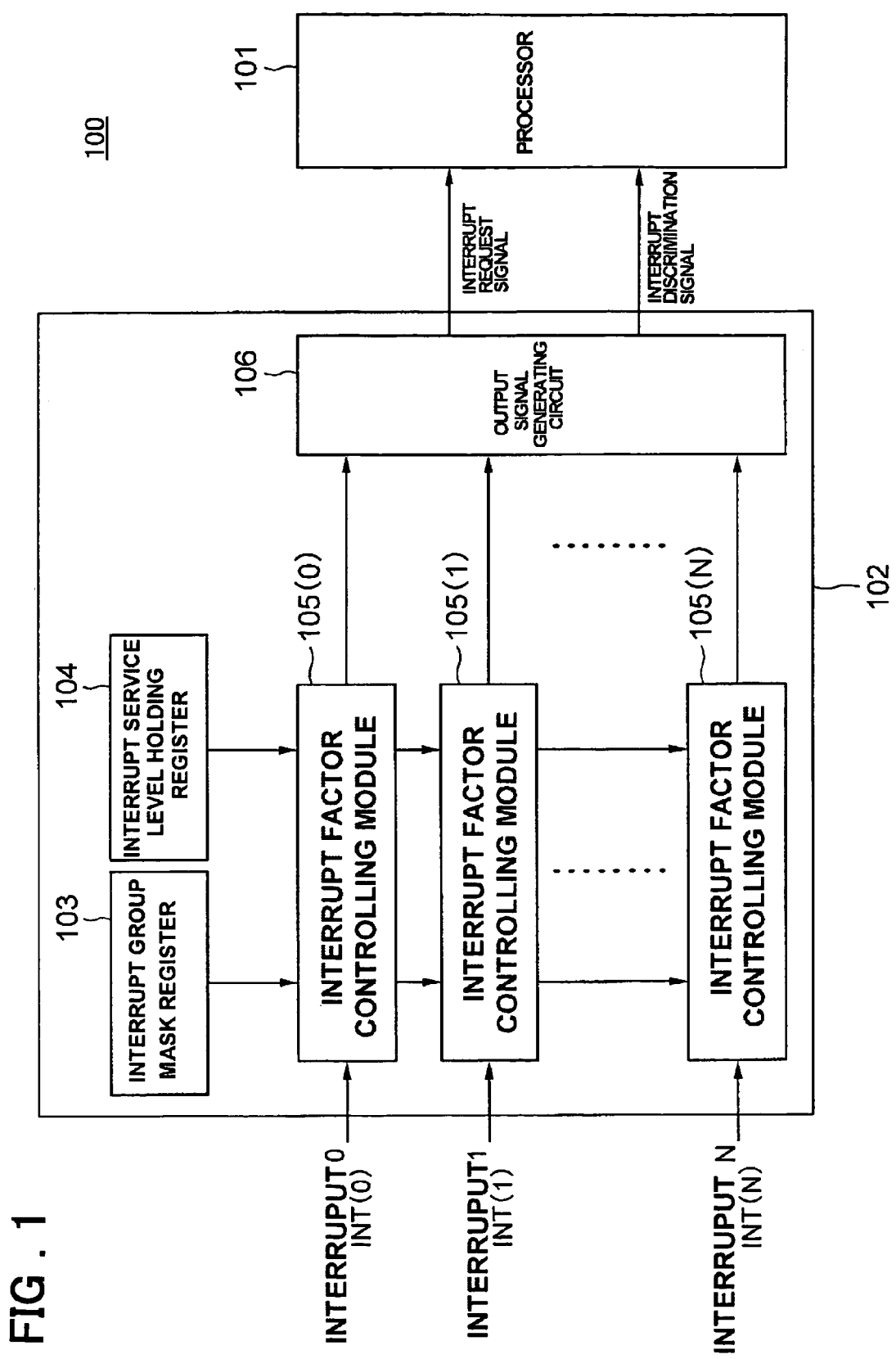
FIG. 1 is a block diagram showing the configuration of a semiconductor device having an interrupt control circuit according to a first embodiment of the present invention.

Referring to the drawings, preferred embodiments of the present invention are explained in detail. FIG. 1 shows the configuration of a semiconductor device 100 having an interrupt control circuit according to a first embodiment of the present invention. The semiconductor device 100 includes a processor 101 and an interrupt control circuit 102. The semiconductor device 100 is used in e.g. an embedded system for controlling, e.g., an electronic control apparatus. The processor 101 is used for system control of electronic controlling devices, for calculating data by the input information supplied from the sensor, for self-diagnosis of the system and for data backup.

The interrupt control circuit 102 includes an interrupt group mask register 103, an interrupt service level holding register 104, an output signal generating circuit 106 and a plural number of interrupt factor controlling modules 105(0) to (N), where N is a natural number. In the present embodiment, the plural interrupt factors are classified into several groups and an interrupt is masked on the group basis to limit the interrupt(s) rendered acceptable by the processor 101. The interrupts are classified into plural groups, for example, a group of interrupts relevant to the system control and a group of interrupts carried out by the processor 101.

The interrupt control circuit 102 is supplied with plural interrupt signals INT(0) to INT(N) and transmits an interrupt request signal and an interrupt discrimination signal to the processor 101. The priority ranks and the groups are set for each interrupt signal INT. FIG. 2 shows the ranks of priority and groups as set to the interrupt signals. In the present example, N=15. As the ranks of priority, four ranks of PRI#0 to PRI#3 are set, whilst eight groups of from Grp#0 to Grp#7 are set.

The priority is set in dependence upon the real-time performance, as required of the interrupt, and the smaller the value of the rank of priority, the higher is the rank of priority. The interrupt signals INT(0), INT(4), INT(8) and INT(12) are interrupts with the highest real-time performance and are set to the highest rank of priority PRI#0. The ranks of priority of the interrupt signals INT(1), INT(5), INT(9) and INT(13) are set to the second highest PRI#1.

The ranks of priority of the interrupt signals INT(2), INT(6), INT(10) and INT(14) are set to the third highest PRI#2. The ranks of priority of the interrupt signals INT(3), INT(7), INT(11) and INT(15) are set to the lowest PRI#3. In case of competition of plural interrupts with the same rank of priority, the processor 101 accepts an interrupt with a smaller interrupt number, out of plural competing interrupts. For example, in case of competition of the interrupt signal INT(0) and the interrupt signal INT(4), both of which are set to the same rank of priority of PRI#0, the processor 101 accepts the interrupt signal INT(0).

There are provided interrupt factor controlling modules 105(0) to (N) in association with the interrupt signals INT(0) to INT(N), respectively. The interrupt group mask register 103 is formed as a register for specifying a group to be masked. The interrupt service level holding register 104 holds the rank of priority as set for the interrupt currently processed by the processor 101. Each interrupt factor controlling module 105 refers to the interrupt group mask register 103 and to the interrupt service level holding register 104 to determine whether or not the input interrupt signal is to be transmitted to the output signal generating circuit 106.

Figure 3:
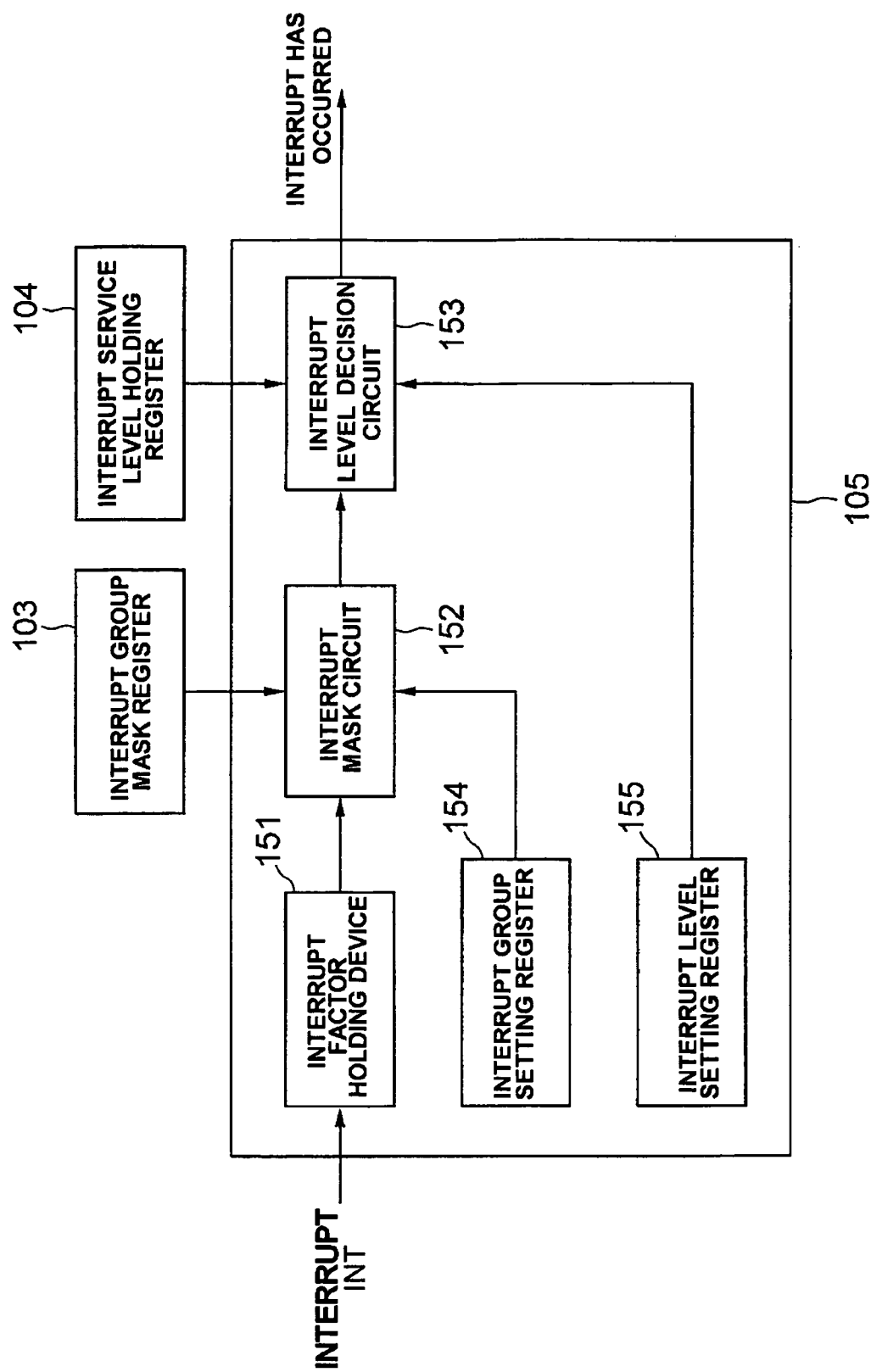
FIG. 3 is a block diagram showing an illustrative structure of an interrupt factor controlling module 105 of FIG. 1.

FIG. 3 shows the configuration of each interrupt factor controlling module 105, shown in FIG. 1. Each of the interrupt factor controlling modules 105(0) to (N) includes an interrupt factor holding device 151, an interrupt mask circuit 152, an interrupt level decision circuit 153, an interrupt group setting register 154, and an interrupt Level setting register 155. The interrupt factor holding device 151 holds the input interrupt signal INT, until the signal INT is accepted by the processor 101, and notifies the fact of interrupt occurrence to the interrupt mask circuit 152.

The interrupt level setting register 155 holds the rank of priority as set for the input interrupt signal INT entered to the interrupt factor controlling module 105. For example, if the rank of priority, shown in FIG. 2, is set for each interrupt, the information indicating the rank of priority PRI#0 is held in the interrupt level setting register 155 of each of the interrupt factor controlling modules 105(0), 105(4), 105(8) and 105 (12), whilst the information indicating the rank of priority PRI#1 is held in the interrupt level setting register 155 of each of the interrupt factor controlling modules 105(1), 105(5), 105(9) and 105(13).

The interrupt group setting register 154 holds the group number as set in the interrupt signal INT supplied to the interrupt factor controlling module 105. For example, if the interrupts are grouped as shown in FIG. 2, the group number 0 is held as the information indicating the group Grp #0 in the interrupt group setting register 154 of each of the interrupt factor controlling modules 105(0) to 105(4), whilst the group number 4 is held as the information indicating the group Grp #4 in the interrupt group setting register 154 of each of the interrupt factor controlling modules 105(8) to 105(12).

The interrupt group mask register 103 is formed as a register having a number of bits corresponding to the number of the groups as set for the interrupt signals INT. In each bit is written the information to the effect that the interrupt signals as set for the group number of the bit in question are to be masked ("1") or the information to the effect that the interrupt signals are not to be masked ("0"). For example, if desired to mask the interrupt signals as set in the group Grp#3, "1" is written in the third bit of the interrupt group mask register 103. If desired to mask the interrupt signals as set in the group Grp#3 and in the group Grp#7, "1" is written in the third and seventh bits of the interrupt group mask register 103.

The interrupt mask circuit 152 reads out the information written in the bit of the interrupt group mask register 103 associated with the group number held by the interrupt group setting register 154. In case the information to the effect that the information to the effect that the interrupt signal is not to be masked ("0") has been written in the read-out bit, the interrupt mask circuit 152 directly supplies to the interrupt level decision circuit 153 the information to the effect that there has occurred an interrupt input from the interrupt factor holding device 151. If conversely the information to the effect that the interrupt signal is to be masked ("1") has been written in the read-out bit, the information to the effect that there has occurred an interrupt input from the interrupt factor holding device 151 is masked without being supplied to the interrupt level decision circuit 153.

The interrupt level decision circuit 153 reads out the rank of priority, as set in the interrupt signal INT, from the interrupt level setting register 155, to compare the rank of priority to the rank of priority of the processing held by the interrupt service level holding register 104 and which is being executed by the processor 101. When supplied with a signal indicating the occurrence of an interrupt from the interrupt mask circuit 152, the interrupt level decision circuit 153 delivers a signal indicating the fact of the inputting of an interrupt to the output signal generating circuit 106 (FIG. 1), in case the rank of priority of the processing currently going on is lower than that set in the interrupt signal INT, as entered to the interrupt factor controlling module 105.

When supplied from the interrupt factor controlling modules 105(0) to (N) with a signal indicating the occurrence of an interrupt, the output signal generating circuit 106 sends an interrupt request signal and an interrupt discrimination signal, associated with the interrupt which has occurred, to the processor 101. When supplied from plural interrupt factor controlling modules 105 with signals indicating the occurrence of interrupts, the output signal generating circuit 106 prioritizes a signal with a smaller value of the interrupt number, and inputs the interrupt request signal and the interrupt discrimination signal, associated with the smaller value of the interrupt number, to the processor 101. On accepting any one interrupt, the processor 101 begins the processing corresponding to the interrupt to update the value of the interrupt service level holding register 104 with the rank of priority as set for the newly accepted interrupt.

Figure 4:
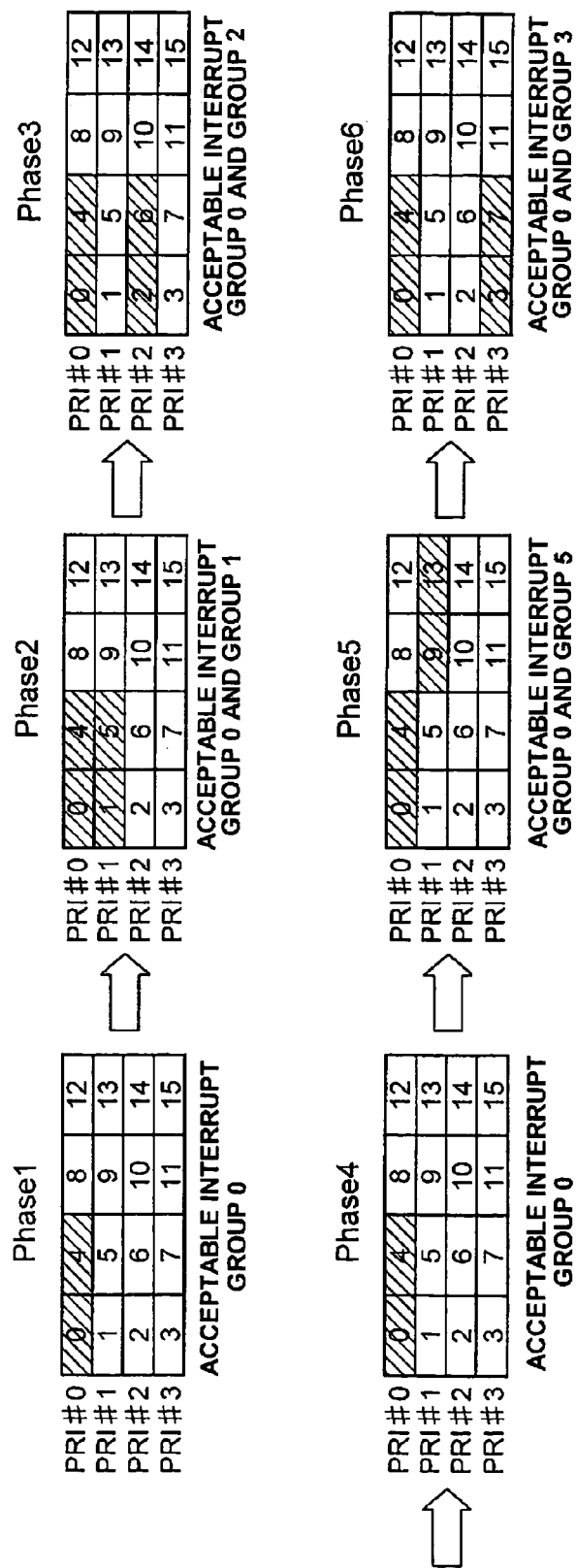
FIG. 4 is a block diagram showing interrupt signals rendered acceptable by a processor.

FIG. 4 shows the interrupt signals, rendered acceptable by the processing 101, with the progress of processing. In the tables of FIG. 4, 0 to 15 represent INT(0) to INT(15). The processor 101 carries out the processing of phases 1 to 6 with lapse of time. It is assumed that the ranks of priority and the groups, as set for the respective interrupt signals, are set as shown in FIG. 2, and that the interrupts of the numbers shown shaded in FIG. 4 are rendered acceptable by the processor 101. In this processing sequence, the interrupts set to the group Grp#0 are rendered acceptable by the processor 101 for all periods (phases), whilst the interrupts, as set for the groups Grp#1 to Grp#3 and the group Grp#5, may or may not be rendered acceptable, depending on the processing allowance of the processor 101.

It is also assumed that the processing sequence progresses such as to satisfy the following conditions. Out of the interrupts, as set for the rank of priority PRI#0, the interrupt signals INT(0) and INT(4), set in the group Grp#0, stand for the most crucial interrupts, such that, should these interrupts take place, the processor 101 has to accept the interrupts immediately. As for the interrupt signals INT(1) and INT(5), set in the group Grp#1, and the interrupt signals INT(9) and INT(13), set in the group Grp#5, there must not be an extended period of time during which these signals remain unaccepted. Also, as for the interrupt signals INT(2) and INT(6), set in the group Grp#2 out of the interrupts set in the rank of priority of PRI#2, and as for the interrupt signals INT(3) and INT(7), set in the group Grp#3, out of the interrupts set in the rank of priority PRI#3, there must not be an extended period of time during which these signals remain unaccepted, even granting that the ranks of priority as set are low.

The interrupt signals INT(8) and INT(12), set in the group Grp#4, are interrupts relevant to the processing to be carried out in an exclusive relation with respect to the processing sequence shown in FIG. 4, and which need not be accepted here. Thus, the interrupts, set in the group Grp#4, are not rendered acceptable during this processing sequence. In a similar manner, the interrupt signals INT(10) and INT(14), set in the group Grp#6, and the interrupt signals INT(11) and INT(15), set in the group Grp#7, stand for the interrupts that need not be accepted for this processing sequence and are not rendered acceptable during this processing sequence.

The phase 1 stands for such a state in which time limitation is short and processing is increased such that processing cannot be achieved within the time limitation and there is left no allowance in the processing capability of the processor 101. In the phase 1, the information for not masking the interrupts ("0") is written in the bits for the group Grp#0 of the interrupt group mask register 103, whilst the information for masking the interrupts ("1") is written in the bits for the other groups. Thus, should an interrupt occur in the interrupt factor controlling modules 105, out of the interrupt factor controlling modules 105(0) to (N), in the interrupt group setting registers 154 of which is written any of group numbers other than the group number 0, the signal indicating the interrupt occurrence is masked by the interrupt mask circuit 152, so that, in the phase 1, the interrupts, rendered acceptable by the processor 101, are limited only to the interrupts as set in the group Grp#0, which are most crucial interrupts for this processing sequence.

The phase 2 stands for such a state in which the operating statuses of the electronic control equipment are changed such that there is certain allowance in the processing capability of the processor 101.

In the phase 2, the information to the effect that interrupt is not to be masked ("0") is written in bits for the groups Grp#0 and Group Grp#1 in the interrupt group mask register 103, whilst the information to the effect that interrupt is to be masked ("1") is written in bits for the remaining groups. This masks interrupts set in the groups other than the groups Grp#0 and Grp#1, such that the processor 101 is able to accept interrupts set in the group Grp#1, in addition to those set in the group Grp#0.

The phase 3 is similar to the phase 2 as to the allowance of the processing capability of the processor 101. However, the phase 3 differs from the phase 2 as to the groups rendered acceptable by the processor 101 in addition to the interrupts as set in the group Grp#0. In the phase 3, the information to the effect that interrupt is not to be masked ("0") is written in bits for the groups Grp#0 and Group Grp#2 in the interrupt group mask register 103, whilst the information to the effect that interrupt is to be masked ("1") is written in bits for the remaining groups. Thus, in the phase 3, the interrupts, set in the group Grp#2, are rendered acceptable, in place of those set in the group Grp#1, along with the group Grp#0.

In the phase 4, the time constraint again becomes shorter, with the allowance of the processing capability of the processor being similar to that in the phase 1. Thus, in the phase 4, as in the phase 1, the information to the effect that the interrupt is not to be masked ("0") is written in bits for the group Grp#0 in the interrupt group mask register 103, whilst the information to the effect that interrupt is to be masked ("1") is written in bits for the remaining groups. Thus, the interrupts, rendered acceptable by the processor 101, are again limited only to interrupts set in the group Grp#0.

In the phase 5, the time constraint becomes slightly longer, such that there is certain allowance in the processing capability of the processor 101. In the phase 5, the information to the effect that an interrupt is not to be masked ("0") is written in bits for the groups Grp#0 and Group Grp#5 in the interrupt group mask register 103, whilst the information to the effect that interrupt is to be masked ("1") is written in bits for the remaining groups. This masks interrupts set in the groups other than the groups Grp#0 and Grp#05, such that, in the phase 5, the processor 101 is able to accept interrupts set in the group Grp#5, in addition to those set in the group Grp#0.

The phase 6 is similar to the phase 5 as to the allowance of the processing capability of the processor 101. However, the phase 6 differs from the phase 5 as to the groups rendered acceptable by the processor 101 in addition to the interrupts in the group Grp#0. In the phase 6, the information to the effect that an interrupt is not to be masked ("0") is written in bits for the groups Grp#0 and Group Grp#3 in the interrupt group mask register 103, whilst the information to the effect that interrupt is to be masked ("1") is written in bits for the remaining groups. Thus, in the phase 6, the interrupts, set in the group Grp#3, in place of those set in the group Grp#5, are rendered acceptable, along with the group Grp#0.

In the present embodiment, the interrupts are rendered acceptable by the processor 101, depending on the allowance in processing, such that, instead of simply rendering the interrupts sequentially acceptable in the order of the falling ranks in priority, the interrupts with lower ranks in priority are transiently rendered acceptable even in such case where there is not much allowance. If, in the present embodiment, it is desired to render acceptable the interrupts set in the ranks of priority PRI#2, control is managed so that, instead of rendering acceptable the interrupts set in the rank of priority PRI#1, part of the interrupts set in the rank of priority PRI#0 and part of those set in the rank of priority PRI#2 are rendered acceptable, as shown in the phase 3 of FIG. 4. By so doing, the processor 101 is able to carry out the processing, such as to deal with interrupts lower in the rank of priority, without affecting the real-time performance, even in such case where there is not much allowance in the processing capability.

Moreover, in the present embodiment, if the group set as an interrupt to be entered is specified as being to be masked by the interrupt group mask register 103, each interrupt factor controlling module 105 reserves the interrupt which has occurred, without transmitting the effect of occurrence of the interrupt to the output signal generating circuit 106. Thus, in the present embodiment, the interrupts set in a group in question may be masked in a lump, simply by specifying the group to be masked. Consequently, at least one interrupt desired to be masked may be masked more readily than in case of the conventional system in which individual interrupts are specified as to whether or not the interrupts are to be masked, respectively.

In the above-described embodiment, the interrupts set in the same rank of priority are divided into plural groups or, stated conversely, the interrupts set in the same group are all of the same rank of priority. However, the groups set for respective interrupts may optionally be set, so that it is unnecessary that the interrupts, set in the same group, be set in the same rank of priority. For example, in the embodiment of FIG. 2, the interrupt signals INT(0) and INT(4), set in the rank of priority PRI#0, and the interrupt signals INT(2) and INT(6), set in the rank of priority PRI#2, may be set in the same group Grp#0.

Figure 5:
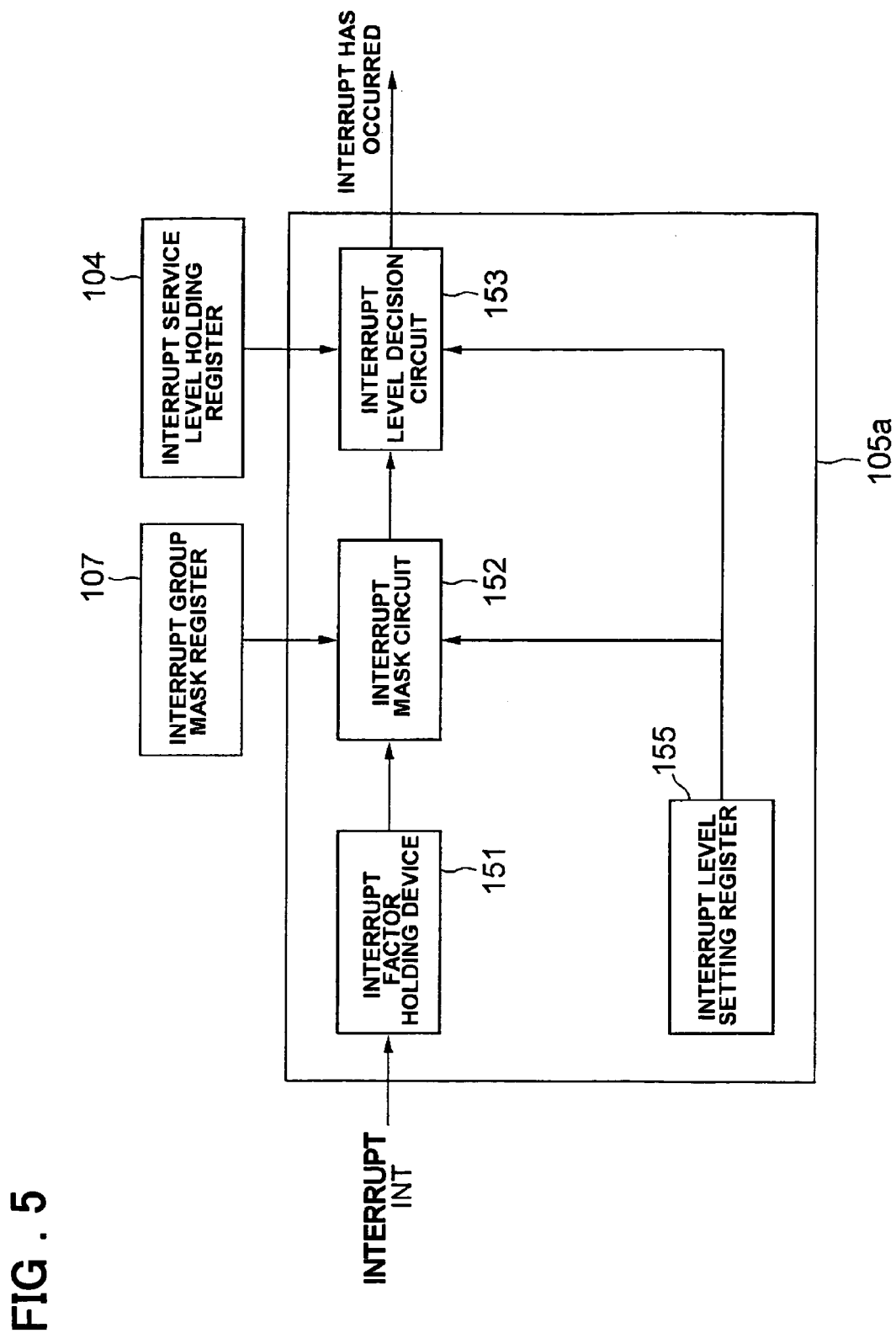
FIG. 5 is a block diagram showing another illustrative structure of an interrupt factor controlling module 105.
Figure 6:
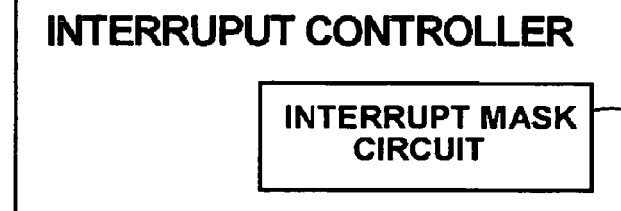
FIG. 6 is a block diagram showing another illustrative structure having a conventional interrupt controller.
Figure 7:
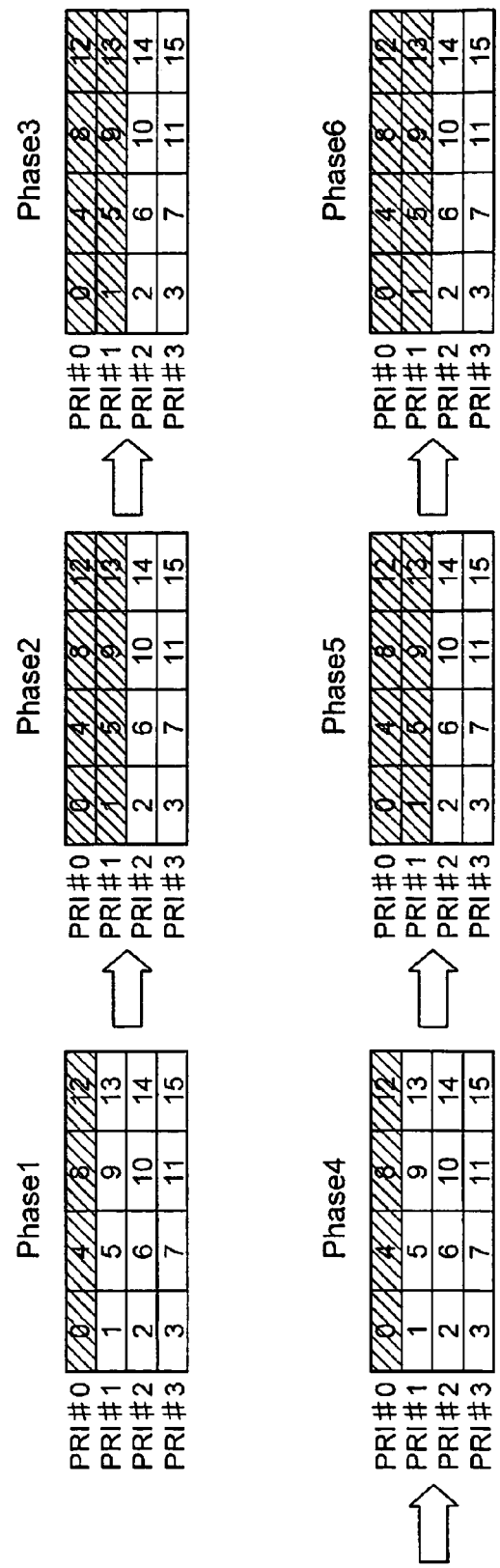
FIG. 7 is a block diagram showing interrupt signals, rendered accessible by the processor, with the progress of the processing.

In addition, the groups and the ranks of priority may be in one-for-one correspondence, for example, the interrupts set in the rank of priority PRI#0 (FIG. 2) may all be set in the group Grp#0 and the interrupts set in the rank of priority PRI#1 may all be set in the group Grp#1. In this case, the interrupt group setting register 154 and the interrupt level setting register 155, shown in FIG. 3, hold the same information. It is then possible to omit the interrupt group setting register 154 in the interrupt factor controlling modules 105a, as shown in FIG. 5. In an interrupt level mask register 107, as in the interrupt group mask register 103 (FIG. 1), the information as to whether or not the interrupt for a given rank of priority is masked is written from one rank of priority to another. The interrupt mask circuit 152 determines whether or not the fact of interrupt occurrence is to be masked, depending on whether or not the information pertinent to the fact of masking the interrupt of the rank of priority held by the interrupt level setting register 155 has been written in the interrupt level mask register 107. With this configuration, interrupts for a given rank of priority to be masked may be masked in a lump by specifying the rank of priority to be masked.

Although the present invention has been explained with reference to preferred embodiments thereof, it is to be noted that the interrupt control circuit according to the present invention is not limited to the above-described embodiments and various changes or correction may be made of the above-described embodiments without departing from the scope of the invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An interrupt controlling circuit for controlling a plurality of interrupts, received by a processor, comprising:

a group setting register for holding information on a group concerned, out of a plurality of groups, as set for each of interrupts in question, out of a plurality of interrupts;

a mask information register for holding information for specifying whether or not to mask an interrupt belonging to the group concerned of said plural groups;

first verification means for verifying whether or not an interrupt in question of the plural interrupts is to be masked, based on information of said group setting register and information of said mask information register, and first masking means for masking said interrupt based on a result of verification.

2. The interrupt controlling circuit as defined in claim 1, further comprising:

a priority rank setting register for holding information on a rank of priority as set for each of interrupts in question, out of the plural interrupts;

a priority rank holding register for holding the rank of priority of the interrupts currently received by a processor;

second verification means for verifying whether or not an interrupt in question of the plural interrupts is to be masked, based on information of said priority rank setting register and said priority rank holding register, and second masking means for masking said interrupt based on a result of the second verification means.

3. The interrupt controlling circuit as defined in claim 1, wherein the information held in said mask information register is sequentially rewritten in dependence upon a state of processing by said processor.

4. The interrupt controlling circuit as defined in claim 2, wherein the information held in said mask information register is sequentially rewritten in dependence upon a state of processing by said processor.

5. An interrupt controlling circuit for controlling a plurality of interrupts received by a processor, comprising:

a priority rank setting register for holding information on a rank of priority, as set for each of interrupts in question, out of a plurality of interrupts;

a mask information register for holding, for each of a plurality of groups, information for specifying whether or not an interrupt belonging to a rank of priority in question, out of said a plurality of interrupts, is to be masked;

first verification means for verifying whether or not an interrupt in question of the plural interrupts is to be masked, based on information of said priority rank setting register and information of said mask information register, and first masking means for masking said interrupt based on a result of verification.

6. The interrupt controlling circuit as defined in claim 5 further comprising:

a priority rank holding register for holding the rank of priority of the interrupts currently received by the processor;

second verification means for verifying whether or not an interrupt in question of the plural interrupts is to be masked, based on the information of said priority rank setting register and the information of said priority rank holding register, and second masking means for masking said interrupt based on a result of the second verification means.

7. The interrupt controlling circuit as defined in claim 5, wherein the information held in said mask information register is sequentially rewritten in dependence upon a state of processing by said processor.

8. The interrupt controlling circuit as defined in claim 6, wherein the information held in said mask information register is sequentially rewritten in dependence upon a state of processing by said processor.

9. The interrupt controlling circuit as defined in claim 2, wherein, if a rank of priority of more than one interrupt of said interrupts in question is equal, then a priority of said more than one interrupt is determined by an interrupt number associated with each of said interrupts.

10. The interrupt controlling circuit as defined in claim 5, wherein, if a rank of priority of more than one interrupt of said interrupts in question is equal, then a priority of said more than one interrupt is determined by an interrupt number associated with each of said interrupts.

* * * * *